United States Patent
Yu et al.

(10) Patent No.: US 12,550,075 B2
(45) Date of Patent: Feb. 10, 2026

(54) ORTHOGONAL FREQUENCY DIVISION MULTIPLE ACCESS POWER CONTROL METHOD AND RELATED ACCESS POINT

(71) Applicant: REALTEK SEMICONDUCTOR CORPORATION, Hsinchu (TW)

(72) Inventors: Cho-Han Yu, Hsinchu County (TW); Chun-Kai Tseng, Hsinchu County (TW); Wen-Yung Lee, Hsinchu County (TW); Jhe-Yi Lin, Hsinchu County (TW); Shau-Yu Cheng, Hsinchu County (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 177 days.

(21) Appl. No.: 18/329,352

(22) Filed: Jun. 5, 2023

(65) Prior Publication Data

US 2023/0403657 A1    Dec. 14, 2023

(30) Foreign Application Priority Data

Jun. 9, 2022 (TW) ................................. 111121516

(51) Int. Cl.
*H04W 52/24* (2009.01)
*H04W 52/36* (2009.01)

(52) U.S. Cl.
CPC ....... *H04W 52/245* (2013.01); *H04W 52/365* (2013.01)

(58) Field of Classification Search
CPC .......................... H04W 52/245; H04W 52/365
See application file for complete search history.

(56) References Cited

U.S. PATENT DOCUMENTS

| | | | |
|---|---|---|---|
| 10,420,034 B1* | 9/2019 | Zheng ................ | H04W 52/267 |
| 10,993,243 B1* | 4/2021 | Zhang ................ | H04W 52/146 |
| 12,245,163 B1* | 3/2025 | Elsayed ............. | H04W 52/383 |
| 2017/0181102 A1* | 6/2017 | Bharadwaj ......... | H04W 52/242 |
| 2018/0249421 A1 | 8/2018 | Bharadwaj et al. | |
| 2018/0270765 A1* | 9/2018 | Wang ................. | H04W 52/02 |
| 2021/0410078 A1* | 12/2021 | Lou .................... | H04W 52/242 |
| 2022/0095401 A1 | 3/2022 | Lu et al. | |
| 2022/0132351 A1 | 4/2022 | Liu et al. | |
| 2023/0199664 A1* | 6/2023 | Takata ................ | H04W 52/40 455/522 |

(Continued)

OTHER PUBLICATIONS

"Real-Time Dynamic Spectrum Management for Multi-User Multi-Carrier Communication Systems," IEEE Transactions on Communications, vol. 62, No. 3, Mar. 2014 (Year: 2014).*

(Continued)

*Primary Examiner* — Joseph E Avellino
*Assistant Examiner* — Lucia G Gradinariu
(74) *Attorney, Agent, or Firm* — WPAT, P.C.; Anthony King

(57) ABSTRACT

An OFDMA power control method includes: transmitting a first trigger frame to a station, wherein the first trigger frame includes a first target RSSI; receiving a first TB-PPDU from the station, wherein the first TB-PPDU is transmitted by the station using a first power according to the first target RSSI; measuring a first power of the first TB-PPDU to obtain a first measured RSSI; and generating a second the target RSSI according to the first measured RSSI.

16 Claims, 4 Drawing Sheets

(56) References Cited

U.S. PATENT DOCUMENTS

2024/0089865 A1* 3/2024 Bharadwaj .......... H04L 27/2601

OTHER PUBLICATIONS

A Survey of the Transmission-Power-Control Schemes in Wireless Body-Sensor Networks,â KSII Transactions on Internet and Information Systems vol. 12, No. 4, Apr. 2018 (Year: 2018).*
Khorov et al., âA Tutorial on IEEE 802.11ax High Efficiency WLANs,â IEEE Communications Surveys & Tutorials, vol. 21, No. 1, First Quarter 2019 (Year: 2019).*
IEEE P802.11be/D1.5, âPart 11: Wireless LAN Medium Access Control (MAC) and Physical Layer (PHY) Specifications Amendment 8: Enhancements for extremely high throughput (EHT)â; Mar. 2022 (Year: 2022).*
Office action of Taiwan counterpart application 111121516.
English brief translation of the office action of Taiwan counterpart application 111121516.

* cited by examiner

ORTHOGONAL FREQUENCY DIVISION MULTIPLE ACCESS POWER CONTROL METHOD AND RELATED ACCESS POINT

CROSS-REFERENCE TO RELATED APPLICATIONS

This application claims the benefit of priority to Patent Application No. 111121516, filed in Taiwan on Jun. 9, 2022, which is incorporated by reference in its entirety.

TECHNICAL FIELD

The present application relates to an orthogonal frequency division multiple access (OFDMA) power control method and a related access point, particularly to a power control method and a related access point based on trigger-based packet protocol data unit (TB-PPDU).

BACKGROUND

In order to improve transmission efficiency in application scenarios of WiFi6, OFDMA is supported when access point (AP) and multiple stations (STA) are transmitting at the same time. However, when the transmission power of the stations cannot be optimized, the advantage of using OFDMA method is diminished.

SUMMARY OF THE INVENTION

One aspect of the present disclosure provides an OFDMA power control method. The OFDMA power control method includes: transmitting a first trigger frame to a station, wherein the first trigger frame includes a first target received signal strength indicator (RSSI); receiving a first TB-PPDU from the station, wherein the first TB-PPDU is transmitted by the station with a first transmission power according to the first target RSSI; measuring a first power of the first TB-PPDU to obtain a first measured RSSI; and generating a second target RSSI according to the first measured RSSI and the first target RSSI.

Another aspect of the present disclosure provides an access point configured to control a transmission power of a station applying OFDMA. The access point includes a transceiver circuit and a processor circuit. The processor circuit is configured to: transmit a first trigger frame to the station using the transceiver circuit, wherein the first trigger frame comprises a first target RSSI; receive a first TB-PPDU from the station via the transceiver circuit, wherein the first TB-PPDU is transmitted by the station with a first transmission power according to the first target RSSI; measure a first power of the first TB-PPDU to obtain a first measured RSSI; and generate a second target RSSI according to the first measured RSSI and the first target RSSI.

Compared to the conventional technology, the OFDMA power control method and the related access point of the present disclosure adjust the transmission power of the station by tracking the measured RSSI so as to optimize the transmission power of the station.

BRIEF DESCRIPTION OF THE DRAWINGS

Various aspects of the present application can best be understood upon reading the detailed description below and accompanying drawings. It should be noted that the various features in the drawings are not drawn to scale in accordance with standard practice in the art. In fact, the size of some features may be deliberately enlarged or reduced for the purpose of discussion.

DETAILED DESCRIPTION

Figure 1:
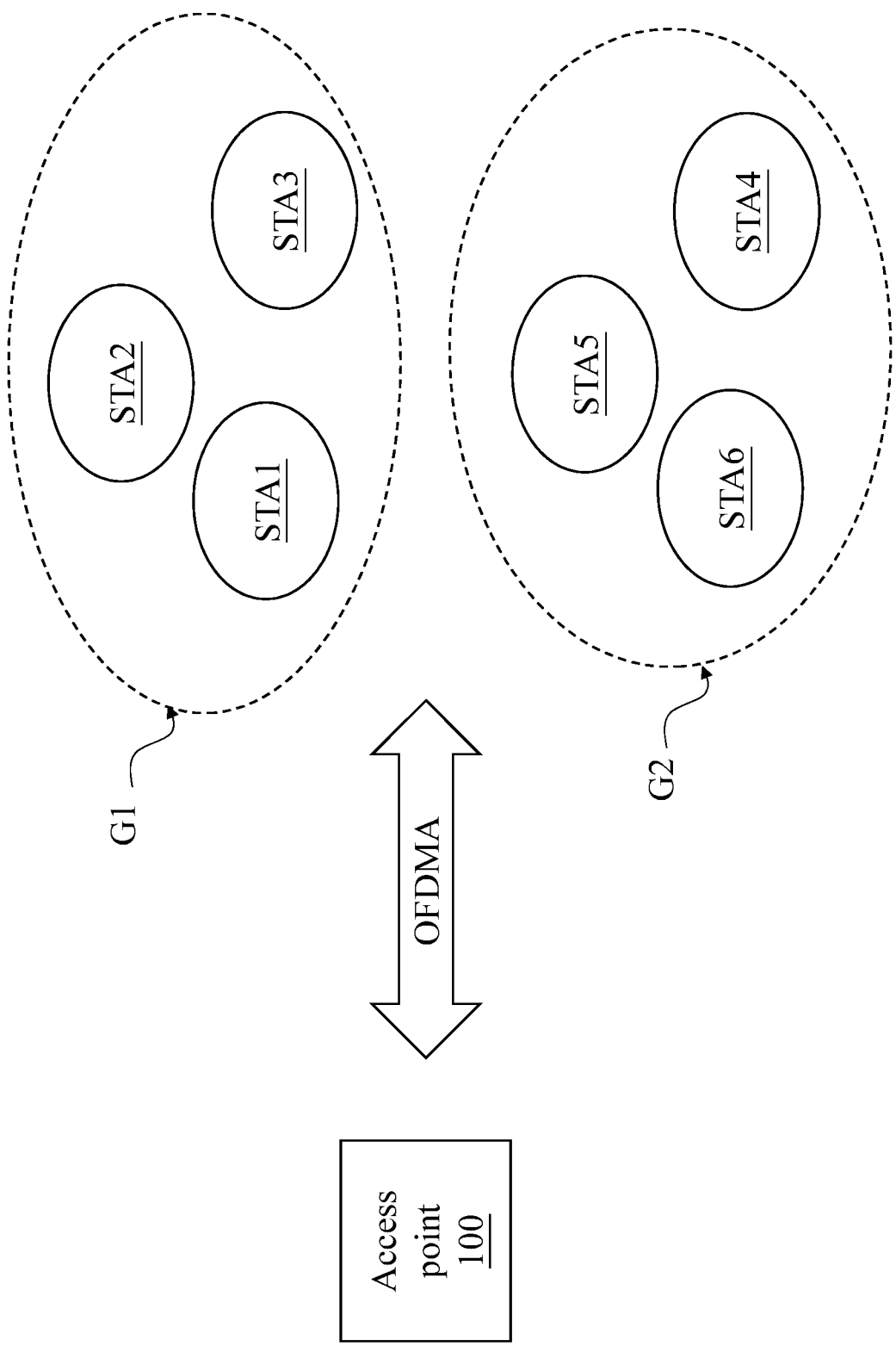
FIG. 1 is a schematic diagram illustrating a network transmission system according to some embodiments of the present disclosure

FIG. 1 is a schematic diagram illustrating a network transmission system 10 according to some embodiments of the present disclosure. The network transmission system 10 can use various access methods to implement the transmission between the AP 100 and multiple stations STA1-STA6; said access methods include but are not limited to, code division multiple access (CDMA), time division multiple access (TDMA), frequency division multiple access (FDMA), orthogonal frequency division multiple access (OFDMA), single carrier frequency division multiple access (SC-FDMA), etc. In some embodiments, the stations STA1-STA6 support WiFi6 (or in compliance with IEEE 802.11ax standard).

Generally, the stations STA1-STA6 are divided into groups G1 and G2 depending on the specification and/or performance. Stations with similar specification and/or performance are divided into the same group so as to implement the OFDMA methods. As could be appreciated, the numbers of the station and group shown FIG. 1 are for illustration purposes only, and the present disclosure is not limited thereto.

When the OFDMA method is in use for transmission, the AP 100 can carry out transmission with multiple stations within a single group (such as stations STA1-STA3 of the group G1) during the same period so as to increase the transmission efficiency. However, when there is a large difference in the specifications and/or performances within multiple stations that are communicating with the AP 100, the transmission efficiency is limited by the station with the inferior specification and/or performance, which worsen the overall transmission efficiency, thereby cancelling the benefits of using the OFDMA method.

In some embodiments, the transmission power is the main factor affecting the performance of stations STA1-STA6. Thus, in order to maintain the benefits brought by the OFDMA method, the network transmission system 10 controls the transmission power of stations STA1-STA6 through the packets transmitted between AP 100 and stations STA1-STA6 in the uplink and downlink.

Figure 2:
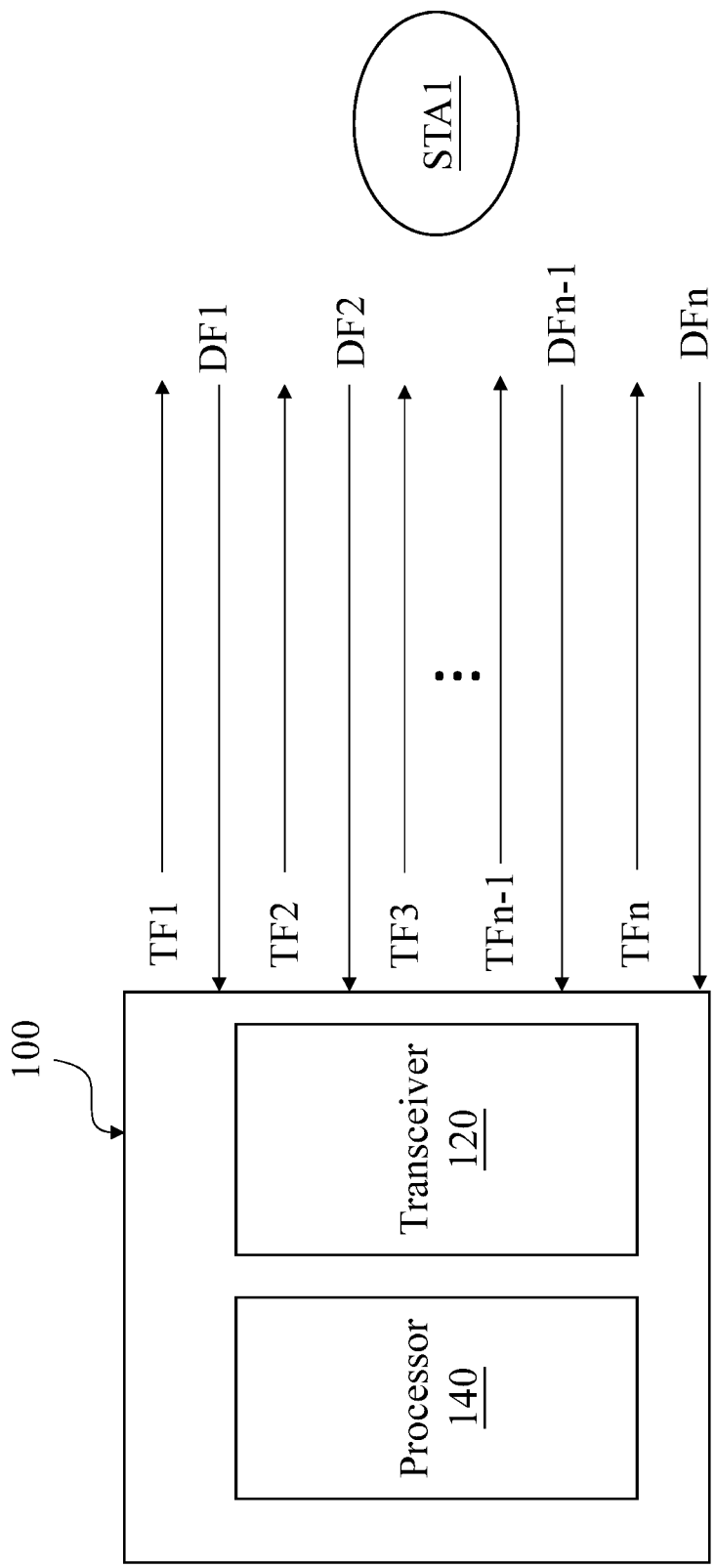
FIG. 2 is a schematic diagram illustrating a transmission between an access point and a station according to some embodiments of the present disclosure.
Figure 3:
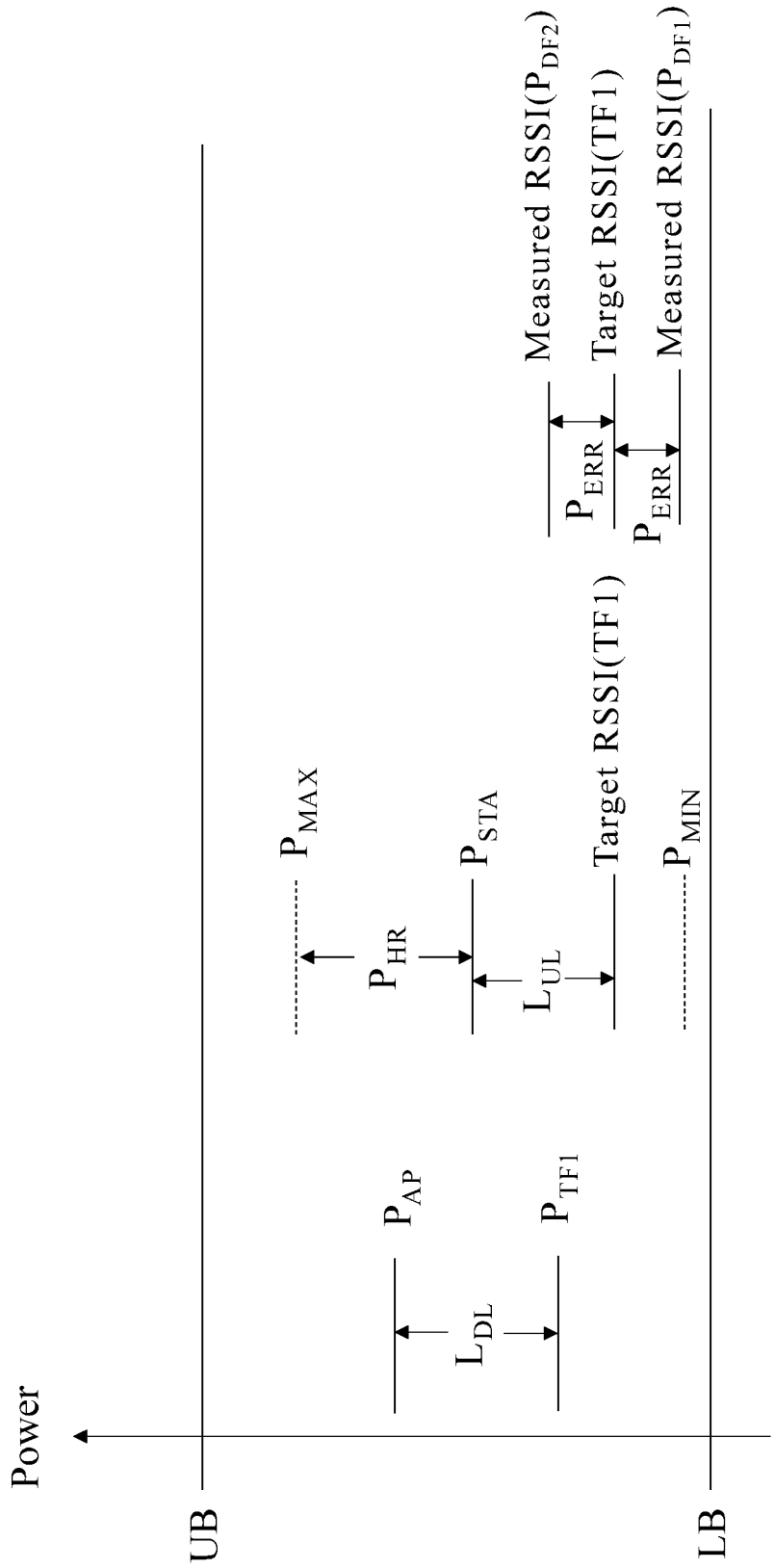
FIG. 3 is a schematic diagram illustrating a relative relationship of parameters according to other embodiments of the present disclosure.

Reference is made to FIG. 2. FIG. 2 is a schematic diagram illustrating the transmission between the AP 100 and STA1 according to some embodiments of the present disclosure. As could be appreciated, FIG. 2 uses only the station STA1 as an example, and the present disclosure is not limited thereto. The station STA1 shown in FIG. 2 can be replaced with any of stations STS2-STA6. For the ease of understanding, reference is also made to the relative relationship of parameters shown in FIG. 3.

The AP 100 includes a transceiver circuit 120 and a processor circuit 140, wherein the transceiver circuit 120 is configured to transmit the packets to and receive the packets from the station STA1, whereas the processor circuit 140 is configured to control the power of the packets transmitted by the station STA1 within a fixed intensity interval.

During the OFDMA downlink, the transceiver circuit 120 is configured to transmit a trigger frame TF1 to STA1. During the OFDMA uplink, the station STA1 generates a trigger-based packet protocol data unit (TB-PPDU) DF1 in response to the receipt of the trigger frame TF1, and transmits the TB-PPDU DF1 to the transceiver circuit 120. In some embodiments, the trigger frame TF1 includes a target received signal strength indicator (RSSI) and a transmission power $P_{AP}$ of the transceiver circuit 120, and the TB-PPDU DF1 includes transmitted data, a power headroom $P_{HR}$ and a minimum power flag of the STA1. In this case, the transmission power of the transceiver circuit 120 represents the transmission power $P_{AP}$ of the transceiver circuit 120 for transmitting the trigger frame TF1; the target RSSI represents the power of the TB-PPDU DF1 expected by the AP 100; the power headroom represents the currently remaining power headroom $P_{HR}$ when the station STA1 transmits the TB-PPDU DF1; and the minimum power flag is configured to indicate whether the station STA1 uses the minimum power $P_{MIN}$ to transmit the TB-PPDU DF1.

When the OFDMA method is performed for transmission, the network transmission system 10 has a given intensity interval upper limit UB and a given intensity interval lower limit LB to the group G1 of the station STA1. The processor circuit 140 is configured to determine whether a pre-determined RSSI is within the intensity interval upper limit UB and the intensity interval lower limit LB. When the pre-determined RSSI is within the intensity interval upper limit UB and the intensity interval lower limit LB, the processor circuit 140 sets the pre-determined RSSI to be the target RSSI in the trigger frame TF1, and transmits the same to the station STA1 using the transceiver circuit 120. When the pre-determined RSSI is not within the intensity interval upper limit UB and the intensity interval lower limit LB, the processor circuit 140 is configured to set the target RSSI to be the intensity interval upper limit UB or the intensity interval lower limit LB. For example, when the pre-determined RSSI is greater than the intensity interval upper limit UB, the processor circuit 140 sets the target RSSI to be the intensity interval upper limit UB. On the other hand, when the pre-determined RSSI is less than the intensity interval lower limit LB, the processor circuit 140 sets the target RSSI to be the intensity interval lower limit LB.

Because the OFDMA transmission performs calculation in the frequency domain, when the processor circuit 140 calculates the power, it will first normalize the power to generate the power spectrum density (PSD), or the PSD will be integrated according to the occupied bandwidth to obtain the power. For example, the RSSI in dBm is normalized to produce a PSD in dBm/Hz, or the PSD in dBm/Hz is integrated into the RSSI in dBm, based on the bandwidth occupied by the PSD.

In some embodiments, the pre-determined RSSI is obtained by integrating a pre-determined PSD, whereas the pre-determined PSD is a given value. In some other embodiments, the pre-determined PSD is the PSD of the power of the TB-PPDU previously transmitted by the station STA1.

The station STA1 generates the TB-PPDU DF1 according to the trigger frame TF1. More specifically, the station STA1 measures a power $P_{TF1}$ of the trigger frame TF1, then subtract the power $P_{TF1}$ of the trigger frame TF1 from the transmission power $P_{AP}$ of the transceiver circuit 120 to obtain a downlink path loss $L_{DL}$. In some embodiments, the downlink path loss $L_{DL}$ substantially equals to an uplink path loss $L_{UL}$. The station STA1 sums up the target RSSI and the uplink path loss $L_{UL}$ to ascertain the transmission power $P_{STA}$ required for the station STA1 to transmit the TB-PPDU DF1. Next, the station STA1 generates the power headroom $P_{HR}$ by subtracting the transmission power $P_{STA}$ to be used from the maximum transmission power $P_{MAX}$, and determines whether the transmission power $P_{STA}$ to be used equals to its available minimum transmission power $P_{MIN}$ so as to generate the minimum power flag. After obtaining the power headroom $P_{HR}$ and the minimum power flag, the station STA1 generates the transmitted data, the power headroom $P_{HR}$ and minimum power flag as the TB-PPDU DF1, which is transmitted to the transceiver circuit 120.

After the transceiver circuit 120 receives the TB-PPDU DF1, the processor circuit 140 is configured to measure the power $P_{DF1}$ of TB-PPDU DF1, wherein the power $P_{DF1}$ is also referred to as a measured RSSI. The processor circuit 140 calculates the intensity difference $P_{ERR}$ between the target RSSI of the trigger frame TF1 and the measured RSSI of the TB-PPDU DF1 and generates the target RSSI of the trigger frame TF2 according to the target RSSI of the trigger frame TF1 and the intensity difference $P_{ERR}$. In some embodiments, the processor circuit 140 sums up the target RSSI of the trigger frame TF1 and the intensity difference $P_{ERR}$ to generate the target RSSI of the trigger frame TF2. In other words, the processor circuit 140 monitors the TB-PPDU DF1 sent from the station STA1 to update the target RSSI of the trigger frame TF1 to generate the target RSSI of the trigger frame TF2, so as to adjust the power that the station STA1 uses to transmit the TB-PPDU DF2.

In some embodiments, the processor circuit 140 is further configured to control the station STA1 such that the transmission power of the station STA1 is adjusted to the maximum value within a permitted range, as discussed below in details.

After the AP 100 and the station STA1 transfer and receive multiple trigger frames TF1-TFn and TB-PPDUs DF1-DFn between each other, the processor circuit 140 is configured to determine whether the intensity difference $P_{ERR}$ converges. More specifically, the processor circuit 140 calculates the intensity difference $P_{ERR}$ between the measured RSSI of the TB-PPDU DFn−1 and the target RSSI of the trigger frame TFn−1, and determines whether the intensity difference $P_{ERR}$ is greater than a threshold value TH.

When several consecutive intensity differences $P_{ERR}$ within a certain period are not less than the threshold value, it means that the measured RSSI of the TB-PPDU DFn−1 is not close to the target RSSI of the trigger frame TFn−1, and hence, the processor circuit 140 determines that the intensity difference $P_{ERR}$ does not converge. In this case, the processor circuit 140 is configured to decrease the pre-determined PSD and generate the target RSSI of the trigger frame TFn according to the decreased pre-determined PSD and the intensity difference $P_{ERR}$.

When several consecutive intensity differences $P_{ERR}$ within a certain period are less than the threshold value TH, it means that the measured RSSI of the TB-PPDU DFn−1 is close to the target RSSI of the trigger frame TFn−1, and hence, the processor circuit 140 determines that the intensity difference $P_{ERR}$ converges. In this case, the processor circuit 140 is configured to increase the pre-determined PSD and generate the target RSSI of the trigger frame TFn according to the increased pre-determined PSD and the intensity difference $P_{ERR}$. Because the pre-determined PSD is increased, the measured RSSI of the TB-PPDU DFn is also increased. In other words, the station STA1 uses a higher power to transmit the TB-PPDU DFn, such that the transmission power of the station STA1 gradually approaches the maximum value of the permitted range.

In some embodiments, the threshold value TH equals to about 0.75 dBm. In some embodiments, when decreasing pre-determined PSD, the pre-determined PSD is decreased by about 0.5 dBm. In some embodiments, when increasing pre-determined PSD, the pre-determined PSD is increased by about 1 dBm.

Figure 4:
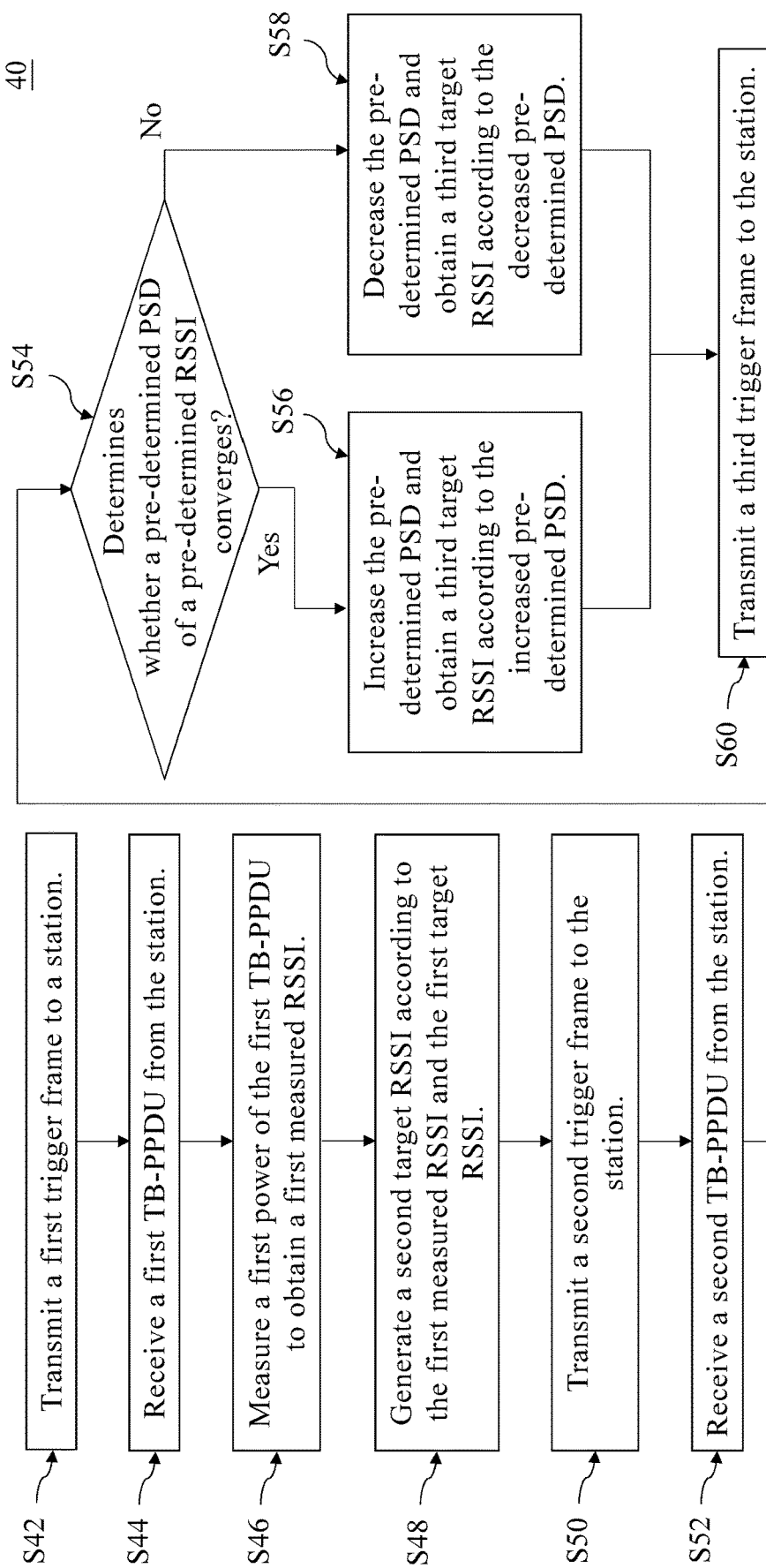
FIG. 4 is a flow chart of an OFDMA power control method according to other embodiments of the present disclosure.

Reference is made to FIG. 4. FIG. 4 illustrates a flow chart of an OFDMA power control method 40 according to some embodiments of the present disclosure. In some embodiments, the AP 100 is configured to perform the OFDMA power control method 40 to control the power of the station STA1. To facilitate understanding, the OFDMA power control method 40 is discussed by referencing to the reference numerals shown in FIG. 1 to FIG. 3. The OFDMA power control method 40 includes Steps S42, S44, S46, S48, S50, S52, S54, S56, S58 and S60. However, the present disclosure is not limited thereto, and all operations disclosed in FIG. 1 to FIG. 3 fall within the scope of the OFDMA power control method 40.

In Step S42, the transceiver circuit 120 transmits the first trigger frame TF1 to the station STA1, wherein the first trigger frame TF1 includes the first target RSSI. In Step S44, the transceiver circuit 120 receives the first TB-PPDU DF1 from the station STA1, wherein the first TB-PPDU DF1 is transmitted by the station STA1 using the first transmission power according to the first target RSSI. In Step S46, the processor circuit 140 measures the first power of the first TB-PPDU DF1 to obtain the first measured RSSI. In Step S48, the processor circuit 140 generates the second target RSSI according to the first measured RSSI and the first target RSSI. In Step S50, the transceiver circuit 120 transmits the second trigger frame TF2 to the station STA1. In Step S52, the transceiver circuit 120 receives the second TB-PPDU DF2 from the station STA1, wherein the second TB-PPDU DF2 is transmitted by the station STA1 using the second transmission power according to the second target RSSI.

In Step S54, the processor circuit 140 determines whether the pre-determined PSD of the pre-determined RSSI converges. When the pre-determined PSD converges, the OFDMA power control method 40 proceeds to Step S56. When the pre-determined PSD does not converge, the OFDMA power control method 40 proceeds to Step S58.

In Step S56, the processor circuit 140 increases the pre-determined PSD and obtains the third target RSSI of the third trigger frame TF3 according to the increased pre-determined PSD. In Step S58, the processor circuit 140 decreases the pre-determined PSD and obtains the third target RSSI of the third trigger frame TF3 according to the decreased pre-determined PSD. After the completion of Step S56 or Step S58, the OFDMA power control method 40 proceeds to Step S60. In Step S60, the transceiver circuit 120 transmits the third trigger frame TF3 to the station STA1, wherein the third trigger frame TF3 includes the third target RSSI.

The foregoing outlines features of several embodiments of the present application so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An orthogonal frequency division multiple access (OFDMA) power control method, comprising:
    transmitting a first trigger frame to a station, wherein the first trigger frame comprises a first target received signal strength indicator (RSSI);
    receiving a first trigger-based packet protocol data unit (TB-PPDU) from the station, wherein the first TB-PPDU is transmitted by the station with a first transmission power according to the first target RSSI;
    measuring a first power of the first TB-PPDU to obtain a first measured RSSI;
    summing up the first target RSSI and a first intensity difference of the first target RSSI and the first measured RSSI to generate a second target RSSI;
    transmitting a second trigger frame to the station, wherein the second trigger frame comprises the second target RSSI;
    receiving a second TB-PPDU from the station, wherein the second TB-PPDU is transmitted by the station using a second transmission power according to the second target RSSI;
    measuring a second power of the second TB-PPDU to obtain a second measured RSSI;
    determining whether a second intensity difference of the second target RSSI and the second measured RSSI converges, wherein the step of determining whether the second intensity difference of the second target RSSI and the second measured RSSI converges comprises:
        determining whether both of the first intensity difference and the second intensity difference are less than a threshold value; and
        when both of the first intensity difference and the second intensity difference are less than the threshold value, the second intensity difference is determined to converge;
    when the second intensity difference converges, increasing the second target RSSI to generate an increased RSSI and determining a third target RSSI for a third trigger frame transmitted to the station according to the increased RSSI and the second intensity difference, wherein the station transmits a third TB-PPDU according to the third RSSI, wherein when the second intensity difference converges, a power spectrum density (PSD) of the third target RSSI is greater than a PSD of the second power;
    receiving the third TB-PPDU; and
    measuring a third power of the third TB-PPDU to obtain a third measured RSSI, wherein the third measured RSSI is greater than the second measured RSSI.

2. The OFDMA power control method of claim 1, wherein when the second intensity difference does not converge, the PSD of the third target RSSI is less than the PSD of the second power.

3. The OFDMA power control method of claim 1, wherein the step of determining whether the second intensity difference converges further comprises:
    calculating the second intensity difference between the second target RSSI and the second measured RSSI, wherein when the second intensity difference is not less than the threshold value, the second intensity difference is determined not to converge.

4. The OFDMA power control method of claim 3, wherein the threshold value equals about 0.75 dBm.

5. The OFDMA power control method of claim 2, wherein when the second intensity difference is determined not to converge, the PSD of the third target RSSI is about 0.5 dBm/Hz less than the PSD of the second power.

6. The OFDMA power control method of claim 3, wherein when the second intensity difference is determined to converge, the PSD of the third target RSSI is about 1 dBm/Hz greater than the PSD of the second power.

7. The OFDMA power control method of claim 1, wherein the first TB-PPDU comprises a first power headroom, wherein when the first power headroom is 0, the second target RSSI equals the first target RSSI.

8. The OFDMA power control method of claim 1, wherein the step of summing up the first target RSSI and the first intensity difference of the first target RSSI and the first measured RSSI to generate the second target RSSI comprises:
when the first measured RSSI is greater than an OFDMA interval upper limit, the second target RSSI is set to be the OFDMA interval upper limit, or when the first measured RSSI is less than an OFDMA interval lower limit, the second target RSSI is set to be the OFDMA interval lower limit.

9. A device configured to control a transmission power of a station applying OFDMA, comprising:
a transceiver circuit; and
a processor circuit configured to:
transmit a first trigger frame to the station using the transceiver circuit, wherein the first trigger frame comprises a first target RSSI;
receive a first TB-PPDU from the station via the transceiver circuit, wherein the first TB-PPDU is transmitted by the station with a first transmission power according to the first target RSSI;
measure a first power of the first TB-PPDU to obtain a first measured RSSI;
sum up the first target RSSI and a first intensity difference of the first target RSSI and the first measured RSSI to generate a second target RSSI;
transmit a second trigger frame to the station using the transceiver circuit, wherein the second trigger frame comprises the second target RSSI;
receive a second TB-PPDU from the station via the transceiver circuit, wherein the second TB-PPDU is transmitted by the station with a second transmission power according to the second target RSSI;
measure a second power of the second TB-PPDU to obtain a second measured RSSI;
determine whether a second intensity difference of the second target RSSI and the second measured RSSI converges, wherein the step of determining whether the second intensity difference of the second target RSSI and the second measured RSSI converges comprises:
determining whether both of the first intensity difference and the second intensity difference are less than a threshold value, and
when both of the first intensity difference and the second intensity difference are less than the threshold value, the second intensity difference is determined to converge;
when the second intensity difference converges, increase the second target to generate an increased RSSI and determine a third target RSSI for a third trigger frame transmitted to the station according to the increased RSSI and the second intensity difference, wherein the station transmits a third TB-PPDU according to the third target RSSI, wherein a power spectrum density (PSD) of the third target RSSI is greater than a PSD of the second power;
receive the third TB-PPDU; and
measure a third power of the third TB-PPDU to obtain a third measured RSSI, wherein the third measured RSSI is greater than the second measured RSSI.

10. The device of claim 9, wherein
when the second intensity difference is determined not to converge, the PSD of the third target RSSI is less than the PSD of the second power.

11. The device of claim 9, wherein when the processor circuit determines whether the second intensity difference converges, the processor circuit is further configured to:
calculate the second intensity difference between the second target RSSI and the first target RSSI,
wherein when the second intensity difference is not less than the threshold value, the second intensity difference is determined not to converge.

12. The device of claim 11, wherein the threshold value equals about 0.75 dBm.

13. The device of claim 10, wherein when the second intensity difference does not converge, the PSD of the third target RSSI is about 0.5 dBm/Hz less than the PSD of the second power.

14. The device of claim 11, wherein when the second intensity difference converges, the PSD of the third target RSSI is about 1 dBm/Hz greater than the PSD of the second power.

15. The device of claim 9, wherein the first TB-PPDU comprises a first power headroom, wherein when the first power headroom is 0, the second target RSSI equals the first target RSSI.

16. The device of claim 9, wherein when the processor circuit generates the second target RSSI, the processor circuit is further configured to:
when the first measured RSSI is greater than an OFDMA interval upper limit, set the second target RSSI to be the OFDMA interval upper limit, and when the first measured RSSI is less than an OFDMA interval lower limit, set the second target RSSI to be the OFDMA interval lower limit.

* * * * *